United States Patent
Visoz et al.

(10) Patent No.: US 7,885,316 B2
(45) Date of Patent: Feb. 8, 2011

(54) EMISSION FOR CDMA COMMUNICATIONS SYSTEMS ON THE MIMO CHANNEL

(75) Inventors: Raphael Visoz, Issy les Moulineaux (FR); Antoine Berthet, Chatenay Malabry (FR)

(73) Assignee: France Telecom, Paris (FR)

( * ) Notice: Subject to any disclaimer, the term of this patent is extended or adjusted under 35 U.S.C. 154(b) by 814 days.

(21) Appl. No.: 11/587,222

(22) PCT Filed: Apr. 21, 2005

(86) PCT No.: PCT/EP2005/004411

§ 371 (c)(1),
(2), (4) Date: Oct. 23, 2006

(87) PCT Pub. No.: WO2005/114888

PCT Pub. Date: Dec. 1, 2005

(65) Prior Publication Data

US 2007/0206662 A1    Sep. 6, 2007

(30) Foreign Application Priority Data

Apr. 22, 2004   (EP) ............................. 04291041

(51) Int. Cl.
*H04B 1/00* (2006.01)
*H04L 1/02* (2006.01)
(52) U.S. Cl. ................... 375/146; 375/267; 375/295
(58) Field of Classification Search ............. 375/146, 375/260, 267, 295, 299, 135; 370/208, 480
See application file for complete search history.

(56) References Cited

U.S. PATENT DOCUMENTS

| 6,351,499 B1 * | 2/2002 | Paulraj et al. ............. 375/267 |
| 6,452,981 B1 * | 9/2002 | Raleigh et al. ............ 375/299 |
| 6,879,576 B1 * | 4/2005 | Agrawal et al. ........... 370/342 |

(Continued)

FOREIGN PATENT DOCUMENTS

EP         1 035 677         9/2000

(Continued)

OTHER PUBLICATIONS

Jan Tubbax, Boris Come, Liesbet Van der Perre, Luc Deneire, Marc Engels, "OFDM versus Single Carrier with Cyclic Prefix: a system-based comparison for binary modulation", IMEC, Belgium, 2002.*

(Continued)

*Primary Examiner*—Chieh M Fan
*Assistant Examiner*—Aristocratis Fotakis
(74) *Attorney, Agent, or Firm*—Cohen Pontani Lieberman & Pavane LLP (57) ABSTRACT

The invention relates to a sending method for multiple users requiring to transmit digital data over a frequency-selective channel with a plurality of send antennas and a plurality of receive antennas, characterized in that it applies to coded and interleaved data (d[n]):
  demultiplexing (105) into K channels, where K is strictly greater than the number T of send antennas, and modulation (107) of the demultiplexed data;
  internal linear coding (108) defined by an N×K generator matrix (W,$W_n$) where N is strictly greater than T, this internal coding being applied to the K-dimensional vectors of the modulated data. The invention also relates to a sending system for implementing said method.

25 Claims, 4 Drawing Sheets

U.S. PATENT DOCUMENTS

| | | |
|---|---|---|
| 7,039,092 B1 * | 5/2006 | Cao et al. .................. 375/140 |
| 7,349,460 B2 * | 3/2008 | Choi et al. .................. 375/146 |
| 2002/0154705 A1 * | 10/2002 | Walton et al. ............... 375/267 |
| 2002/0168017 A1 | 11/2002 | Berthet et al. |
| 2003/0048857 A1 * | 3/2003 | Onggosanusi et al. ....... 375/267 |
| 2004/0066838 A1 | 4/2004 | Choi et al. |
| 2004/0196919 A1 * | 10/2004 | Mehta et al. ................ 375/267 |
| 2005/0174932 A1 * | 8/2005 | Deng et al. ................. 370/208 |
| 2007/0275668 A1 * | 11/2007 | Gresset et al. ............... 455/69 |

FOREIGN PATENT DOCUMENTS

| | | |
|---|---|---|
| WO | WO 02/21729 | 3/2002 |
| WO | WO 02/35762 A | 5/2002 |
| WO | WO 03/001726 A | 1/2003 |

OTHER PUBLICATIONS

Sampath et al., "Joint transmit and receive optimization for high data rate wireless communication using multiple antennas", Signals, Systems, and Computers, 1999, Conference Record of the 33$^{rd}$ Asilomar Conference on Oct. 24-27, 1999, Piscataway, NJ, IEEE, vol. 1, pp. 215-219.

* cited by examiner

EMISSION FOR CDMA COMMUNICATIONS SYSTEMS ON THE MIMO CHANNEL

This is a U.S. National Phase Application under 35 USC 371 of International Application PCT/EP2005/004411, filed on 21 Apr. 2005.

GENERAL TECHNICAL FIELD

The present invention relates to the field of digital communications. It concerns how to route digital data on a frequency-selective MIMO channel with a view to maximizing spectral efficiency.

GENERAL DESCRIPTION OF THE PRIOR ART

Sending

With the advent of antenna technologies, communications models based on the various multiple access techniques (TDMA (time division multiple access), CDMA (code division multiple access), and OFDMA (orthogonal frequency division multiple access)) are systematically reviewed and extended to encompass MIMO channels. With the aim of improving spectral efficiency, systems must additionally be studied under overload conditions, i.e. with a number of users chosen to be greater than the available resource (in terms of separate time slots or frequency slots and/or orthogonal spreading codes) at the same time as preserving the possibility of separating them on detection (see for example reference [1]).

[1] H. Sari, F. Vanhaverbeke, M. Moeneclaey, "Channel overloading in Multiuser and Single User Communications", ref.

Recent theoretical work has explored the potential of multiple antennas for sending (T antennas) and receiving (R antennas) and highlight a potential considerable increase in capacity. Of the space-time coding schemes adapted to MIMO transmission, only the BLAST approach [2] (see below), for which the capacity increases in a linear fashion with min(T, R) (ergodic case) is able to support remarkably high bit rates.

[2] G. J. Foschini, "Layered Space-Time Architecture for Wireless Communication in a Fading Environment When Using Multiple Antennas", Bell Labs Tech. J., vol. 2, no. 2, pp. 41-59, 1996.

Figure 1:
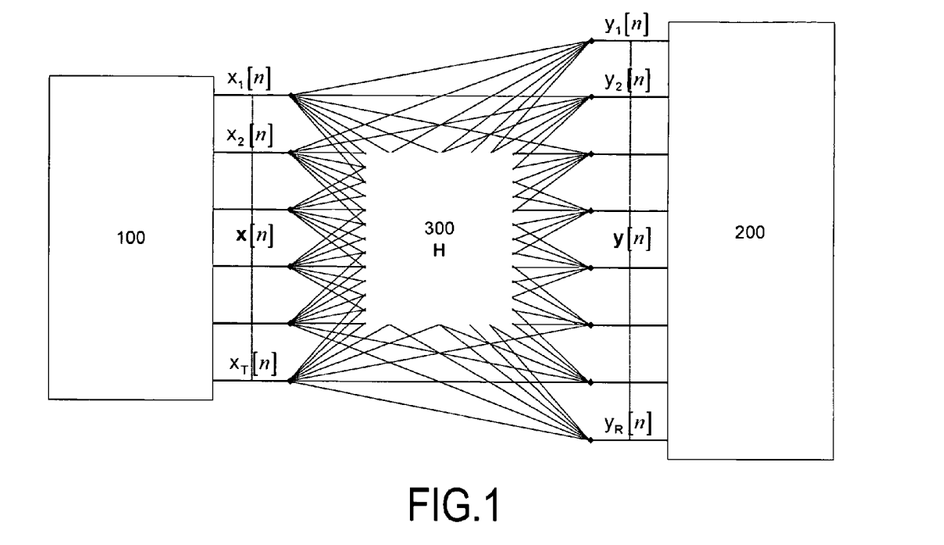
FIG. 1 shows the concept of the VBLAST technique applied to a frequency-selective MIMO channel.

Referring to FIG. 1, the BLAST concept on sending 100, amounting to simple spatial demultiplexing of the data over the various sending layers (V-BLAST), authorizes any type of modulation scheme (single-carrier, multicarrier, with or without spectral spreading) and may be combined with coding of the external channel 300 followed by bit interleaving (ST-BICM interleaved coded modulation).

Accordingly, a STBICM-type sending model employing specific scrambling codes on each layer is disclosed in document [3] for example (see below). A formal analogy may be made with MC-CDMA when the spreading is effected in the frequency domain.

Reception is referenced 200 in FIG. 1.

[3] D. L. Shilling, "Efficient Shadow Reduction Antenna System for Spread Spectrum", U.S. Pat. No. 6,128,330, October 2000.

SUMMARY OF THE INVENTION

The first aspect of the invention proposes a sending method according to any one of claims 1 to 21.

A second aspect of the invention proposes a sending system according to any one of claims 22 to 25.

An object of the present invention is to propose a space-time coding scheme based on a combination of simple mechanisms and techniques with a view to increasing spectral efficiency and combating the harmful effects of the frequency-selective MIMO transmission channel with T send antennas and R receive antennas, on the general hypothesis of the absence on sending of CSI (i.e. information as to the state of the channel).

Main objectives of the present invention are, furthermore:

- a send space-time coding scheme comprising a channel corrector coding and external interleaving method;
- a send space-time coding scheme based on demultiplexing coded data to produce K>T separate streams of symbolic coded interleaved data;
- a send space-time coding scheme based on space-time or space-frequency internal linear coding (or spreading) by means of a resource limited in orthogonal codes of length N or N/T, these codes being re-used so that operation of the system beyond saturation may be envisaged with the aim of increasing spectrum efficiency;
- multiplexing of data coded, modulated, spread in space and in time over T separate send antennas;
- a sending space-time coding scheme the spectral efficiency whereof may be adapted very closely to propagation conditions.

In particular, the invention proposes a sending system comprising:

means for guaranteeing temporal decorrelation of samples of noise affecting the chips when reforming on reception the multiple access model with K users in the assumed absence of MAI+ISI, said means consisting in internal linear periodic coding followed by chip interleaving or internal linear aperiodic coding, before transmission over the MIMO channel. Note that although chip interleaving is not necessary for internal linear aperiodic coding, it remains an option.

DESCRIPTION OF THE FIGURES

Other features and advantages of the invention will emerge further from the following description, which is purely illustrative and non-limiting and must be read with reference to the appended drawings in which.

DESCRIPTION OF PREFERRED EMBODIMENTS OF THE PRESENT INVENTION

1. General Structure of the Sender

The present invention describes a modulation/coding scheme of great spectral efficiency and high adaptability capacity relying on the use of spread spectrum modulation and on the use of multiple send and receive antennas. The solution proposed is pertinent assuming no knowledge of the send channel (no CSI) and a perfect knowledge of the receive channel (CSI).

1.1 External Coding of Data

Figure 2:
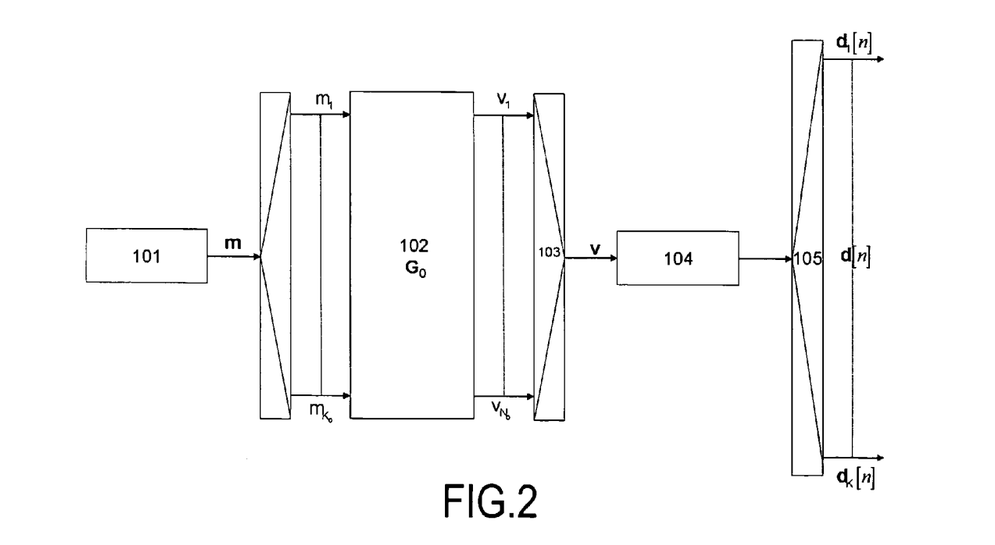
FIG. 2 shows a generic method of external channel coding of digital information, interleaving, and demultiplexing into K streams.

The usable digital data is collected and grouped into a message m of $K_o$ bits constituting the source 101 of the send digital data. To any message m, a linear external code $C_o$, with $N_o \times K_o$ generator matrix $G_o$ and constructed on $F_2$ assigns at 102 a code word v of length $N_o$ bits defined by the matrix equation:

$$v = G_o m$$

The external coding yield is:

$$\rho = \frac{K_o}{N_o}$$

The length $N_o$ of the code words is linked to the various parameters of the system by the equation:

$$N_o = K \times L \times q$$

in which K designates the total number of users, L the length of the packets (in symbol times), and q the number of bits per modulation symbol. The code may be of any type, for example a convolutional code, a turbo code, an LDPC code, etc. In a multiple access type configuration, the message m consists in a plurality of multiplex messages from different sources. Coding is effected independently of each component message. The code word v results from the concatenation of the various code words produced.

1.2 Bit Interleaving

After multiplexing 103, the code word v is sent to an interleaver 104 (operating at the bit level and, where appropriate, having a particular structure). In a multiple access type configuration, interleaving is effected piece by piece on the various code words placed one after the other. The output of this interleaver 104 is parceled into KL sets of q bits called integers.

1.3 Demultiplexing and Modulation

The integer stream is subjected to a process 105 of demultiplexing onto K separate channels, K being strictly greater than T, and chosen arbitrarily. The output from this operation is a K×L matrix D of integers. The L columns of d[n]n= 0, . . . , L−1 of this matrix D have the following structure:

$$d[n] = [d_1[n]^T d_2[n]^T \ldots d_K[n]^T]^T \in F_2^{qK}$$

in which the component integers $d_k[n]$ k=1, . . . , K are themselves structured as follows:

$$d_k[n] = [d_{k,1}[n] d_{k,2}[n] \ldots d_{k,q}[n]]^T \in F_2^q$$

Figure 3:
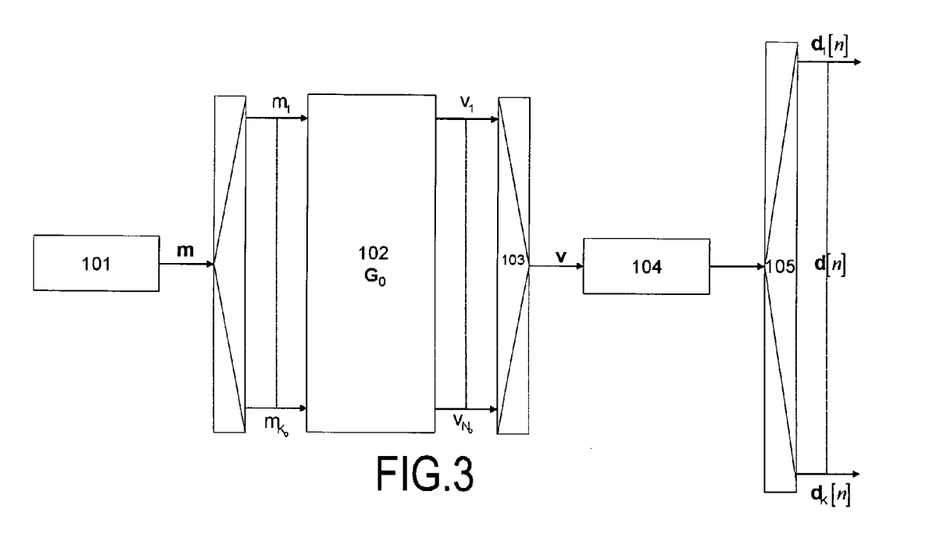
FIG. 3 shows a process of space-time (or space-frequency) internal linear coding (or spreading) followed by multiplexing to T send antennas.

Referring to FIG. 3, the integers $d_k[n]$ of the matrix D are then individually modulated (107) into modulated data, more particularly here into complex symbols $s_k[n]$ of a constellation $\Im \subset C$ with $Q=2^q$ elements via a modulation table $\mu: F_2^q \mapsto \Im$. This operation transforms the integer matrix D into a K×L complex matrix S the L columns s [n] n=0, . . . , L−1 whereof are structured as follows:

$$s[n] \triangleq \mu(d[n]) = [s_1[n] \; s_2[n] \ldots s_K[n]]^T \in \Im^k$$

It is useful to specify the following converse relationships:

$$\mu^{-1}(s[n]) \triangleq d[n] \mu^{-1}(s_k[n]) \triangleq d_k[n] \mu_j^{-1}(s_k[n]) \triangleq d_{k,j}[n]$$

1.4 Internal Linear Coding (or Spreading) Strategies

There are several options for the definition of the generator matrix W defining internal linear coding over the body of the complexes (or spreading), which may impact on the structure of the sender and on the characteristics of the linear front-ends on reception:

Periodic spreading (or internal coding) where W is re-used in each symbol time. To guarantee temporal decorrelation of samples of noise affecting the chips when reforming the multiple access system after equalization, chip interleaving must be applied before transmission on the MIMO channel; or Aperiodic spreading (or internal coding) in which w depends explicitly on the symbol time. Aperiodic spreading guarantees temporal decorrelation of samples of noise affecting the chips when the multiple access system is reformed after equalization. Chip interleaving is no longer necessary but remains an option.

Moreover, the spreading may be space-time spreading (or space-frequency spreading) when it is performed in one block for all of the antennas or merely temporal (or frequency) spreading if it is effected independently for each antenna.

Four main types of internal linear code will therefore be described below:

aperiodic space-time (or space-frequency) internal linear coding (or spreading);

aperiodic temporal (or frequency) internal linear coding (or spreading);

periodic space-time (or space-frequency) internal linear coding (or spreading;

periodic time (or frequency) internal linear coding (or spreading).

1.5 Aperiodic Space-time (or Space-frequency) Spreading (or Internal Linear Coding) Without Chip Interleaving Referring to FIG. 3, aperiodic space-time (space-frequency) spreading is assumed here. The space-time (space-frequency) spreading is effected for each matrix S by means of a N×K internal coding matrix $W_n$ where:

$$N = T \times S_F S_F \in \mathbb{Z}$$

The internal coding yield (or load) of the system is the ratio:

$$\alpha = \frac{K}{N}$$

Multiplying the symbol vector s [n] by the internal coding matrix W produces a vector:

$$z[n] \triangleq W_n s[n] = [z_1[n] z_2[n] \ldots z_N[n]]^T \in \mathbb{C}^N$$

The relationship may also be written at the matrix level:

ti $Z \triangleq W_n S \in \mathbb{C}^{N \times L}$

The chip vectors $z_n$ [n] n=0, ..., L −1 are multiplexed into T separate chip streams (one for each send antenna). The effect of this operation is to transform the N×L chip matrix Z:

$$Z = [z[0] z[1] \ldots z[L-1]] \in \mathbb{C}^{N \times L}$$

into a $T \times LS_F$ chip matrix X:

$$X = [x[0] x[1] \ldots x[LS_F - 1]] \in \mathbb{C}^{T \times LS_F}$$

the columns x[l] l=0, ..., $LS_F$ −1 whereof constitute the inputs of the MIMO channel:

$$x[l] = [x_1[l] x_2[l] \ldots x_T[l]]^T \in \mathbb{C}^T$$

N orthogonal codes of length N are available for constructing the internal coding matrix $W_n$. The system is overloaded as soon as:

K>N

Consider the result of the polynomial division of K by N:

K=AN+B

The K users are therefore divided into A saturated groups of N users and one unsaturated group of B users. We set:

$$\Omega_{N,N} = \begin{bmatrix} \omega_{1,1} & \omega_{1,2} & \cdots & \omega_{1,N} \\ \omega_{1,1} & \omega_{2,2} & \cdots & \omega_{2,N} \\ \vdots & \vdots & \ddots & \vdots \\ \omega_{N,1} & \omega_{N,2} & \cdots & \omega_{N,N} \end{bmatrix} \in \mathbb{C}^{N \times N}$$

an N×N matrix representing a unit group of spreading codes formed of the N orthogonal codes (Hadamard matrix for example) that by construction satisfies the equation:

$$\Omega_{N,N}^\dagger \Omega_{N,N} = I$$

and $$\Omega_{N,B} = \begin{bmatrix} \omega_{1,k_1} & \omega_{1,k_2} & \cdots & \omega_{1,k_B} \\ \omega_{2,k_1} & \omega_{2,k_2} & \cdots & \omega_{2,k_B} \\ \vdots & \vdots & \ddots & \vdots \\ \omega_{N,k_1} & \omega_{N,k_2} & \cdots & \omega_{N,k_B} \end{bmatrix} \in \mathbb{C}^{N \times B}$$

a truncated version, formed of B columns drawn at random in $\Omega_{N,N}$.

Likewise:

$$\Omega_{N,B}^\dagger \Omega_{N,B} = I$$

The diagonal N×N matrix, the diagonal elements whereof are normalized QPSK chips drawn pseudo-randomly, is called the scrambling matrix for the saturated group of users i =1, ..., A and written:

$$\sum\nolimits_{N,N}^{(n,i)} = \begin{bmatrix} \varsigma_1^{(n,i)} & & & \\ & \varsigma_2^{(n,i)} & & \\ & & \ddots & \\ & & & \varsigma_N^{(n,i)} \end{bmatrix} \in \mathbb{C}^{N \times N}$$

Similarly, the N×N scrambling matrix for the unsaturated group of B users is called:

$$\sum\nolimits_{N,N}^{(n,B)} = \begin{bmatrix} \varsigma_1^{(n,B)} & & & \\ & \varsigma_2^{(n,B)} & & \\ & & \ddots & \\ & & & \varsigma_N^{(n,B)} \end{bmatrix} \in \mathbb{C}^{N \times N}$$

This scrambling matrix will therefore make it possible to guarantee decorrelation of the chip streams sent over the various antennas (by means of the scrambling codes) when it is applied to the spreading matrix to form the internal coding matrix $W_n$ as follows:

$$W_n = \left[ \sum\nolimits_{N,N}^{(n,1)} \cdots \sum\nolimits_{N,N}^{(n,A)} \sum\nolimits_{N,N}^{(n,B)} \right] \begin{bmatrix} \Omega_{N,N} & & & \\ & \ddots & & \\ & & \Omega_{N,N} & \\ & & & \Omega_{N,B} \end{bmatrix} \in \mathbb{C}^{N \times K}$$

It may always be written in the form:

$$W_n = \begin{bmatrix} w_{1,1}^{(n)} & w_{1,2}^{(n)} & \cdots & w_{1,K}^{(n)} \\ w_{2,1}^{(n)} & w_{2,2}^{(n)} & \cdots & w_{2,K}^{(n)} \\ \vdots & \vdots & \ddots & \vdots \\ w_{N,1}^{(n)} & w_{N,2}^{(n)} & \cdots & w_{N,K}^{(n)} \end{bmatrix} \in \mathbb{C}^{N \times K}$$

1.6 Independent Aperiodic Time (or frequency) Spreading for each End Antenna (Re-use Principle), Without Chip Interleaving In this other variant of the invention, described with reference to FIG. 6, compatible with the HSDPA mode of the UMTS standard, there are $S_F$ orthogonal codes of length $S_F$. The parameter N is always a multiple of T.

$$N = T \times S_F \cdot S_F \in \mathbb{Z}$$

The $S_F$ codes available are re-used for each send antenna (this is the code re-use principle). The spreading, effected independently for each antenna, is time spreading or frequency spreading. This imposes that K is also a multiple of T:

$$K = T \times U \; U \in \mathbb{Z}$$

This non-limiting condition according to the invention then leads to a new expression for the internal coding yield (load):

$$\alpha = \frac{U}{S_F}$$

The internal coding matrix $W_n$ has a block diagonal structure:

$$W_n = \begin{bmatrix} W_n^{(1)} & & & 0 \\ & W_n^{(2)} & & \\ & & \ddots & \\ 0 & & & W_n^{(T)} \end{bmatrix} \in \mathbb{C}^{N \times K}$$

the block $W_n^{(t)}$ of the internal coding matrix being associated with the antenna t with dimension $S_F \times U$.

Figure 6:
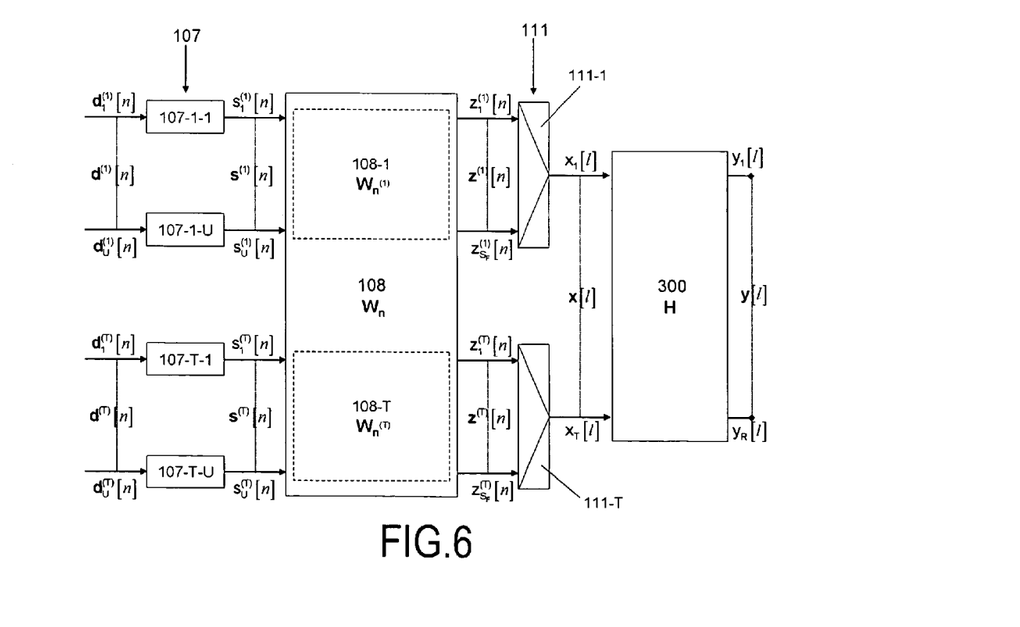
FIG. 6 shows a time (or frequency) method of internal linear coding (or spreading) and of independent multiplexing at each antenna, compatible with the UMTS HSDPA mode.

Referring to FIG. 6, the integer vector d[n] (demultiplexed at 105, after being coded at 102 and interleaved at 104) sent at the time n has the following particular structure:

$$d[n] = [d^{(1)}[n]^T d^{(2)}[n]^T \ldots d^{(T)}[n]^T]^T \in \mathbb{F}_2^{qK}$$

in which the symbol vectors $d^{(t)}[n]$ $t=1, \ldots, T$ are themselves defined as follows:

$$d^{(t)}[n] = [d_1^{(t)}[n]^T \ldots d_U^{(t)}[n]^T]^T \in \mathbb{F}_2^{qU}$$

Referring to FIG. 6, the modulation 107 of this multiplexed data d[n] yields a vector of symbols sent at the time n having the following particular structure:

$$s[n] = [s^{(1)}[n]^T s^{(2)}[n]^T \ldots s^{(T)}[n]^T]^T \in \mathbb{C}^K$$

in which the symbol vectors $s^{(t)}[n]$ $t=1, \ldots, T$ are themselves defined as follows:

$$s^{(t)}[n] = [s_1^{(t)}[n] s_2^{(t)}[n] \ldots s_U^{(t)}[n]]^T \in \mathbb{C}^U$$

The multiplication 108 of the symbol vector s[n] by the internal coding matrix $W_n$ produces the vector:

$$z[n] \triangleq W_n s[n]$$

which also has a particular structure:

$$z[n] = [z^{(1)}[n]^T z^{(2)}[n]^T \ldots z^{(T)}[n]^T]^T \in \mathbb{Z}^N$$

in which the chip vectors [n] $t=1, \ldots, T$ are themselves defined as follows:

$$z^{(t)}[n] \triangleq W_n^{(t)} s^{(t)}[n] = [z_1^{(t)}[n] z_2^{(t)}[n] \ldots z_{S_F}^{(t)}[n]]^T \in \mathbb{Z}^{S_F}$$

For each antenna t, the chip vector $z^{(t)}[n]$ is then multiplexed at 109-t onto the send antenna t that is associated with it.

It will be noted that, in this sending variant, the recovery of the spatial diversity is effected via the external code $G_0$ (at 102) and external bit interleaving (at 104). The overload capacity, known to increase with the length of the spreading codes, is lower.

The overload conditions and the explicit construction of the matrix $W_n$ may be explained as follows. The system is overloaded as soon as:

$$T \times U > S_F$$

This does not necessarily imply $U > S_F$ (i.e. there is not necessarily an overload at each antenna).

When $U > S_F$, the various antennas are overloaded individually. The condition $T \times U > S_F$ is then trivial to verify and the system with multiple antennas is qualified as entirely overloaded.

Consider the result of the polynomial division of U by $S_F$:

$$U = AS_F + B$$

The U users associated with each of the send antennas are thus divided into A saturated groups of $S_F$ users and one unsaturated group of B users.

We set:

$$\Omega_{S_F,S_F} = \begin{bmatrix} \omega_{1,1} & \omega_{1,2} & \cdots & \omega_{1,S_F} \\ \omega_{2,1} & \omega_{2,2} & \cdots & \omega_{2,S_F} \\ \vdots & \vdots & \ddots & \vdots \\ \omega_{S_F,1} & \omega_{S_F,2} & \cdots & \omega_{S_F,S_F} \end{bmatrix} \in \mathbb{C}^{S_F \times S_F}$$

an $S_F \times S_F$ matrix representing a unitary group of spreading codes formed of the $S_F$ orthogonal codes (Hadamard matrix for example) that by construction satisfy the equation:

$$\Omega_{S_F,S_F}^\dagger \Omega_{S_F,S_F} = I$$

and $$\Omega_{S_F,B}^{(t)} = \begin{bmatrix} \omega_{1,k_1}^{(t)} & \omega_{1,k_2}^{(t)} & \cdots & \omega_{1,k_B}^{(t)} \\ \omega_{2,k_1}^{(t)} & \omega_{2,k_2}^{(t)} & \cdots & \omega_{2,k_B}^{(t)} \\ \vdots & \vdots & \ddots & \vdots \\ \omega_{S_F,k_1}^{(t)} & \omega_{S_F,k_2}^{(t)} & \cdots & \omega_{S_F,k_B}^{(t)} \end{bmatrix} \in \mathbb{C}^{S_F \times B}$$

a truncated version, specific to the antenna t, formed of B columns drawn a random in $\Omega_{S_F,S_F}$.

Likewise:

$$\Omega_{S_F,B}^{(t)\dagger} \Omega_{S_F,B}^{(t)} = I$$

An $S_F \times S_F$ diagonal matrix, the diagonal elements of which are normalized QPSK chips drawn randomly, is called the scrambling matrix for the saturated group of users $i=1, \ldots, A$ and written:

$$\sum\nolimits_{S_F,S_F}^{(n,t,i)} = \begin{bmatrix} \varsigma_1^{(n,t,i)} & & & \\ & \varsigma_2^{(n,t,i)} & & \\ & & \ddots & \\ & & & \varsigma_{S_F}^{(n,t,i)} \end{bmatrix} \in \mathbb{C}^{S_F \times S_F}$$

Similarly, the $S_F \times S_F$ matrix:

$$\sum\nolimits_{S_F,S_F}^{(n,t,B)} = \begin{bmatrix} \varsigma_1^{(n,t,B)} & & & \\ & \varsigma_2^{(n,t,B)} & & \\ & & \ddots & \\ & & & \varsigma_{S_F}^{(n,t,B)} \end{bmatrix} \in \mathbb{C}^{S_F \times S_F}$$

is called the scrambling matrix for the unsaturated group associated with the antenna t.

This scrambling matrix associated with the block $(W_n^{(t)})$ will therefore make it possible to guarantee decorrelation of the chip streams sent over the antenna t (by means of the scrambling codes), when it is applied to the spreading matrix to form the block $W_n^{(t)}$ of the internal coding matrix $W_n$ as follows:

$$W_n^{(t)} = \begin{bmatrix} \Sigma_{S_F,S_F}^{(n,t,1)} & \cdots & \Sigma_{S_F,S_F}^{(n,t,A)} & \Sigma_{S_F,S_F}^{(n,t,B)} \end{bmatrix}$$

-continued $$\begin{bmatrix} \Omega_{S_F,S_F} & & & \\ & \ddots & & \\ & & \Omega_{S_F,S_F} & \\ & & & \Omega_{S_F,B}^{(t)} \end{bmatrix} \in \mathbb{C}^{S_F \times U}$$

It may always be written in the form:

$$W_n^{(t)} = \begin{bmatrix} w_{1,1}^{(n,t)} & w_{1,2}^{(n,t)} & \cdots & w_{1,U}^{(n,t)} \\ w_{2,1}^{(n,t)} & w_{2,2}^{(n,t)} & \cdots & w_{2,U}^{(n,t)} \\ \vdots & \vdots & \ddots & \vdots \\ w_{S_F,1}^{(n,t)} & w_{S_F,2}^{(n,t)} & \cdots & w_{S_F,U}^{(n,t)} \end{bmatrix} \in \mathbb{C}^{S_F \times U}$$

Note: For obvious reasons of simplicity, this section covers a situation in which the internal coding matrix $W_n$ is made up of blocks $w_n^{(t)}$ ($t \in [1;T]$) with exactly the same dimensions as each other ($S_F \times U$).

This case may be extended to more general cases in which the internal coding matrix $W_n$ is made up of blocks with dimensions that differ from each other, and in particular the most general case in which the block $w_n^{(t)}$ has dimensions $S_F \times U_t$, $U_t$ being the number of potential channels of the antenna t, which is therefore not necessarily the same from one antenna to another.

The matrix $W_n$ is therefore of dimension $N \times K$ with $$K = \sum_{t=1}^{T} U_t.$$

The sending method could then be adapted to this variant.

1.7 Periodic Spreading

Here the processing is identical to that of section 1.5 or 1.6, except that here the generator matrix is applied periodically in time and expressed as follows:

$$\forall n, W_n = W$$

1.8 Chip Interleaving

Figure 4:
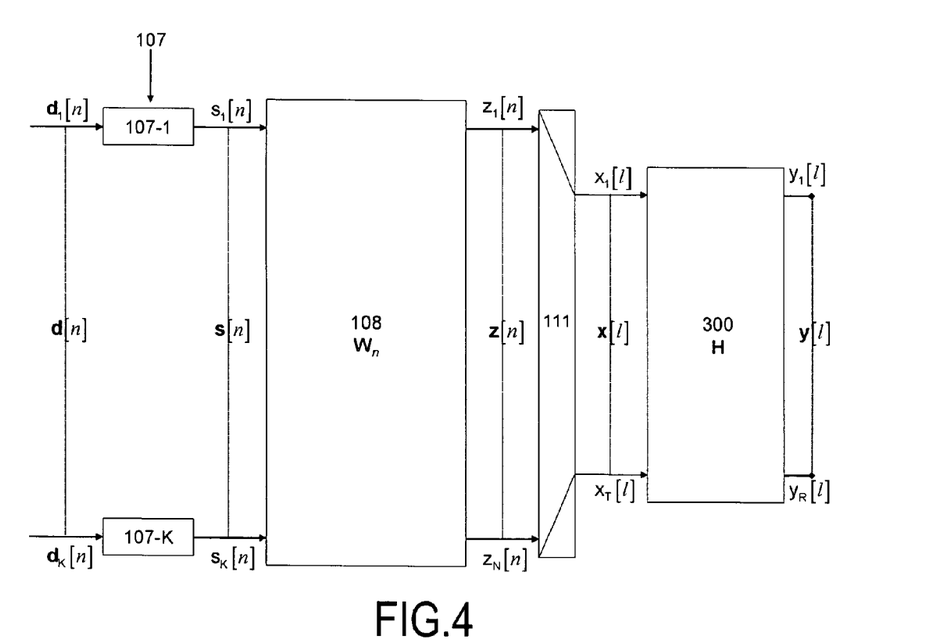
FIG. 4 shows a space-time (or space-frequency) internal linear coding (or spreading) method followed by multiplexing onto a single channel, chip level interleaving, and then demultiplexing onto the T send antennas.
Figure 5:
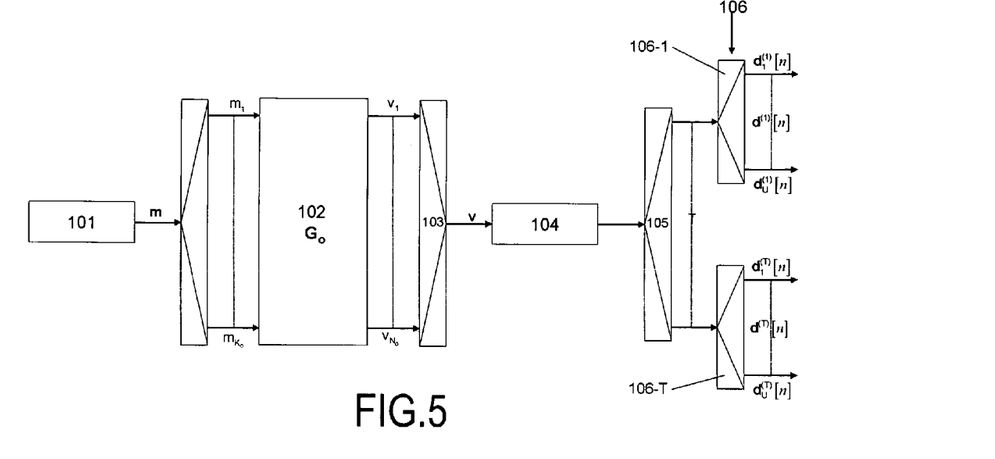
FIG. 5 shows a generic method of external channel coding of digital information, interleaving, first demultiplexing into T streams (space demultiplexing) followed by second demultiplexing into U streams (code demultiplexing)
Figure 7:
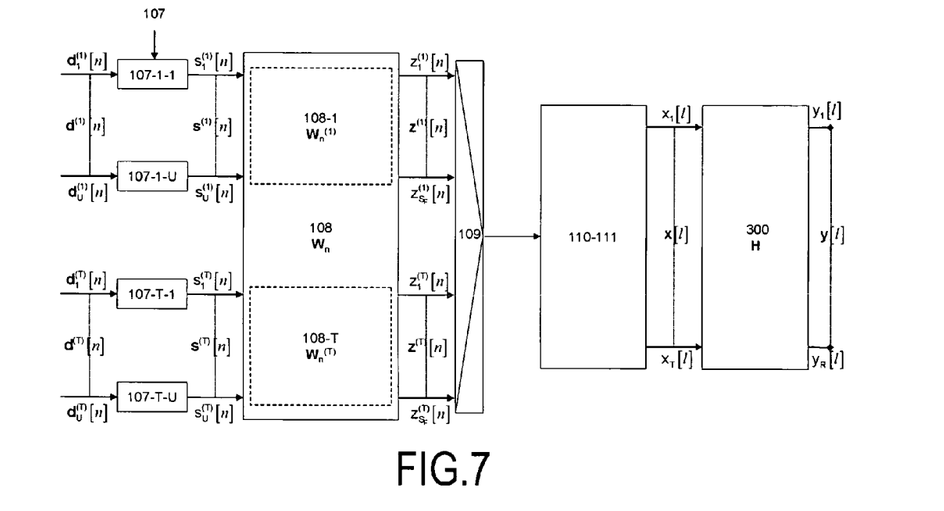
FIG. 7 shows a method of time (or frequency) internal linear coding (or spreading) and of independent multiplexing at each antenna, followed by multiplexing into a single stream, interleaving at chip level, and then demultiplexing onto the T send antennas, compatible with the UMTS HSDPA mode.

Referring to FIGS. 4 and 7, linear internal coding (or spreading) of any kind corresponding to one of the strategies described in sections 1.5 to 1.7 is assumed here, but coupled to chip interleaving 108.

After chip spreading 108, the chip vectors z[n] n=0, ..., L−1 are multiplexed at 109 into a single stream of chips. The chip stream then drives an interleaver 110, the output whereof is demultiplexed at 111 into T separate chip streams, one for each send antenna. The effect of this operation is to transform the N×L chip matrix Z:

$$Z = [z[0] z[1] \ldots z[L-1]] \in \mathbb{C}^{N \times L}$$

into a $T \times LS_F$ chip matrix X:

$$X = [x[0] x[1] \ldots x[LS_F - 1]] \in \mathbb{C}^{T \times LS_F}$$

whereof the columns $x[l]$ $l=0, \ldots, LS_F - 1$ constitute the inputs of the MIMO channel:

$$X[l] = [x_1[l] x_2[l] \ldots x_T[l]]^T \in \mathbb{C}^T$$

1.9 Spectral Efficiency

The sending method fits naturally into the general class of space-time codes. The spectral efficiency of the system (in bits per use of the channel), assuming a limited band ideal Nyquist filter, is equal to:

$$\eta = T \times \rho_o \times q \times \alpha$$

In practice, the send shaping filter has a non-null overflow factor (roll-off) $\epsilon$. At the receiver, a filter matched to the send filter is used for all the receive antennas. It is assumed that the channel estimation and timing and carrier synchronization functions are implemented so that the coefficients of the impulse response of the channel are regularly spaced by an amount equal to the chip time (channel equivalent in the discrete baseband to the chip time). This hypothesis is legitimate, the Shannon sampling theorem imposing sampling at the rate $(1+\epsilon)/T_c$ which may be approximated by $1/T_c$ when $\epsilon$ is small.

Direct generalization is possible for expressions given below for a sampling rate equal to a multiple of $1/T_c$.

2. Channel Model

Transmission is effected on a frequency-selective B-block channel with multiple inputs and outputs (MIMO):

$$H \triangleq \{H^{(1)}, H^{(2)}, \ldots, H^{(B)}\}$$

The channel $H^{(b)}$ is assumed constant over $L_X$ chips with the convention:

$$L \times S_F = B \times L_X B \in \mathbb{Z}$$

The chip matrix X may be segmented into B separate $T \times L_X$ chip matrices $X^{(1)}, \ldots, X^{(B)}$ (padded on the right and left with physical zeros or guard times if necessary), each matrix $X^{(b)}$ seeing the channel $H^{(b)}$.

The extreme cases of the B-block model are as follows:

$$B=1 \text{ and } L_X = LS_F \rightarrow L_S = L \text{ quasi-static model}$$

$$B = LS_F \text{ and } L_X = 1 \rightarrow L_S = 1 \text{ ergodic (chip) model}$$

A renumbering of the chips is applied within each block.

For any block index b, the discrete time baseband equivalent channel model (chip timing) is used to write the vector $y^{(b)}[l] \in \mathbb{C}^R$ received at the chip time 1 in the form:

$$y^{(b)}[l] = \sum_{p=0}^{P-1} H_p^{(b)} x^{(b)}[l-p] + v^{(b)}[l]$$

where P is the constraint length of the channel (in chips), $x^{(b)}[l] \in \mathbb{C}^T$ is the complex vector of T chips sent at the chip time 1, $H_p^{(b)} \in \mathbb{C}^{R \times T}$ is the matrix coefficient indexed p of the impulse response of the block MIMO channel indexed b and $v^{(b)}[l] \in \mathbb{C}^R$ is the complex additive noise vector. The complex additive noise vectors $v^{(b)}[l]$ are assumed to be independent and identically distributed in accordance with an R-dimensional Gaussian law of circular symmetry with zero mean and covariance matrix $\sigma^2 I$. The P coefficients of the impulse response are R×T complex matrices, the inputs of which are identically distributed independent Gaussian inputs, with zero mean and with a covariance matrix satisfying the global power normalization constraint $$E\left[diag\left\{\sum_{p=0}^{P-1} H_p^{(b)} H_p^{(b)\dagger}\right\}\right] = TI$$

in the case of a system with power equally distributed between the send antennas. Given these hypotheses, the eigen values of the correlation matrices of the coefficients of the MIMO channel conform to a Wishart distribution. It is emphasized that equal distribution of the power to the send antennas is a legitimate power allocation policy in the case of an absence of knowledge of the sending channel (no CSI).

3. Multipath MIMO Channel Single-carrier Transmission (HSDPA)

It is assumed here that the bit rate is very high and that the Doppler frequency of the channel is low, so that $L_X \Box S_F$. For the HSDPA mode of the UMTS standard, the channel is quasi-static, i.e. B=1.

4. Multipath MIMO Channel Multicarrier Transmission (MC-CDMA)

Figure 8:
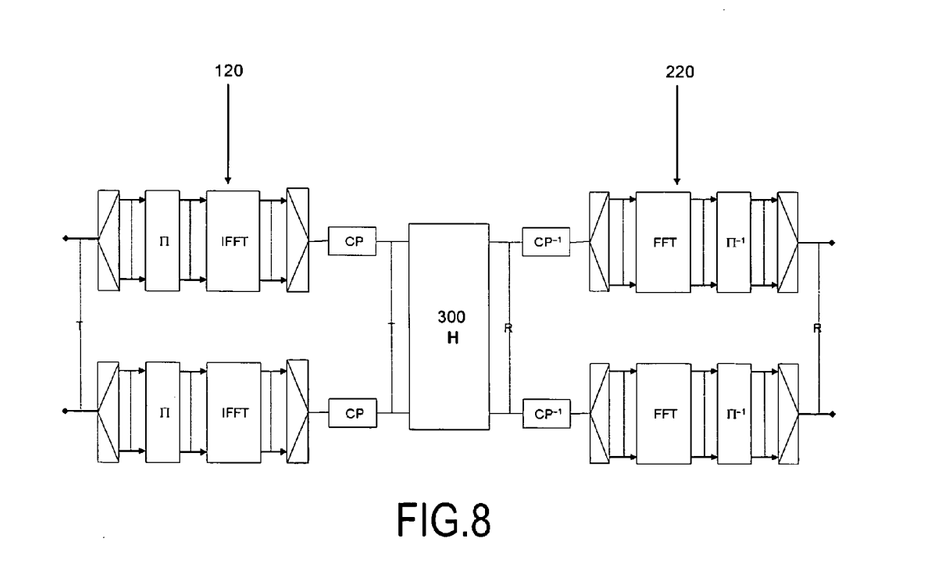
FIG. 8 shows the flat ergodic or block fading equivalent channel obtained by decomposition of the frequency-selective MIMO in the Fourier base, routinely used for modeling multicarrier modulation.

Here the internal linear coding 108 is space-frequency coding or frequency coding. With reference to FIG. 8, it is well known to the person skilled in the art that the introduction of a send IFFT at 120 and a receive FFT at 220 yields (ignoring interleaving) an equivalent channel that is not frequency-selective (channel modeled by a circulating matrix using cyclic prefixes, then rendered diagonal in the Fourier base). Accordingly, each carrier sees a flat MIMO equivalent channel. Using the formalism previously described, the channel after FFT may be seen as a non-selective B-block channel (P=1, M=0).

Reception in accordance with the invention refers not only to the method for implementing it but also to the system for executing it.

The invention claimed is:

1. A sending method for multiple users requiring transmission of digital data over a frequency-selective channel with a plurality of send antennas and a plurality of receive antennas and applied to coded and interleaved data, the method comprising the steps of:
   demultiplexing the coded and interleaved data into K channels, where K is strictly greater than a number T of the plurality of send antennas;
   modulating the demultiplexed K channels of data into K-dimensional vectors of modulated data; and
   applying internal linear coding defined by an N×K generator matrix to the K-dimensional vectors of the modulated data, wherein N is strictly greater than T and a yield K/N of the internal linear coding is strictly greater than 1,
   wherein said generator matrix is constructed from N orthogonal spreading codes of length N, producing a spreading factor equal to N.

2. The sending method according to claim 1, wherein the spreading codes are re-used several times in the generator matrix to form a plurality of groups of spreading codes in the generator matrix such that the spreading codes of each group of spreading codes are mutually orthogonal.

3. The sending method according to claim 2, wherein said generator matrix is further constructed from a plurality of scrambling codes superposed on the spreading codes so that each group of spreading codes is assigned a different scrambling code of the plurality of scrambling codes.

4. The sending method according to claim 1, wherein the linear internal coding is effected independently at each of the T send antennas and for an antenna t of the T send antennas is applied to a modulated data vector of dimension $U_t$ strictly greater than 1, with $$K = \sum_{t=1}^{T} U_t,$$

said generator matrix being a diagonal block matrix, the number of blocks being equal to the number T of send antennas, and the block associated with the antenna t being of dimension (N/T)×$U_t$.

5. The sending method according to claim 4, wherein the dimension $U_t$ of the block associated with the antenna t is the same as that of each of the other blocks of the generator matrix, $U_t$ being denoted U and each block being of dimension (N/T)×$U_t$.

6. The sending method according to claim 4, wherein each of said blocks of the generator matrix is constructed from N/T orthogonal spreading codes of length N/T, producing a spreading factor N/T.

7. The sending method according to claim 4, wherein the blocks are constructed from the same orthogonal spreading codes.

8. The sending method according to claim 4, wherein the generator matrix is further constructed from a plurality of scrambling codes superposed on the spreading codes so that each of said blocks of the spreading matrix is assigned a different scrambling code of the plurality of scrambling codes.

9. The sending method according to claim 4, wherein K is strictly greater than N/T.

10. The sending method according to claim 4, wherein $U_t$ is strictly greater than N/T regardless of the value of t.

11. The sending method according to claim 10, wherein each of said blocks is constructed from a plurality of groups of spreading codes, each group of spreading codes being constructed from N/T orthogonal codes of length N/T, producing a spreading factor N/T, the N/T spreading codes being re-used several times per block to form said plurality of groups of spreading codes per block, so that the spreading codes of each group of spreading codes are mutually orthogonal.

12. The sending method according to claim 11, wherein the generator matrix is further constructed from a plurality of scrambling codes superposed on the spreading codes so that each group of spreading codes is assigned a different scrambling code of the plurality of scrambling codes, said scrambling codes for each group and each block being different from each other.

13. The sending method according to claim 1, wherein the method further comprises, after applying the internal linear coding:
   multiplexing data resulting from the internal linear coding to form multiplexed data;
   interleaving the multiplexed data to form interleaved data; and
   demultiplexing the interleaved data to distribute the interleaved data over the T send antennas.

14. The sending method according to claim 1, wherein the method further comprises, after applying the internal linear coding, demultiplexing data resulting from the internal linear coding to distribute the interleaved data over the T send antennas.

15. The sending method according to claim 1, wherein the internal linear coding is applied to the K-dimensional vectors of the modulated data periodically in time.

16. The sending method according to claim 1, wherein the internal linear coding is applied to the K-dimensional vectors of the modulated data aperiodically in time.

17. The sending method according to claim 1, wherein the method further comprises, before said demultiplexing, at least one external coding of the digital data coming from one or more users of the multiple users to form coded digital data and interleaving of the coded digital data to form said coded and interleaved data.

18. The sending method according to claim 1, wherein the internal linear coding is effected in the frequency domain and the transmission is of the multicarrier type.

19. The sending method according to claim 1, wherein the internal linear coding is effected in the time domain and the transmission is of the single-carrier type.

20. A sending system for multiple users requiring transmission of digital data over a frequency-selective channel with a plurality of send antennas and a plurality of receive antennas, the sending system comprising:
a demultiplexer configured to demultiplex coded and interleaved data into K channels, where K is strictly greater than a number T of the plurality of send antennas;
a modulator configured to modulate output data of the demultiplexer; and
an internal linear encoder configured to code by means of an N×K generator matrix K-dimensional vectors of data at the output of the modulator,
wherein N is strictly greater than T and a yield K/N of the internal linear encoder is strictly greater than 1, and
wherein said generator matrix is constructed from N orthogonal spreading codes of length N, producing a spreading factor equal to N.

21. The sending system according to claim 20, further comprising:
a multiplexer configured to multiplex data coded by said internal linear encoder to form multiplexed data;
an interleaver configured to interleave the multiplexed data to form interleaved data; and
a demultiplexer configured to distribute the interleaved data over the T send antennas.

22. The sending system according to claim 20, wherein the system further comprises a demultiplexer configured to demultiplex data coded by said internal linear encoder to distribute the data coded by said internal linear encoder over the T send antennas.

23. The sending system according to claim 20, wherein the system further comprises, upstream of the demultiplexer:
an encoder configured to encode the digital data coming from one or more users of the multiple users to form coded digital data;
a bit level interleaver configured to interleave the coded digital data to form said coded and interleaved data.

24. A sending method for multiple users requiring transmission of digital data over a frequency-selective channel with a plurality of send antennas and a plurality of receive antennas and applied to coded and interleaved data, the method comprising the steps of:
demultiplexing the coded and interleaved data into K channels, where K is strictly greater than a number T of the plurality of send antennas;
modulating the demultiplexed K channels of data into K-dimensional vectors of modulated data; and
applying internal linear coding defined by an N×K generator matrix to the K-dimensional vectors of the modulated data, wherein N is strictly greater than T and a yield K/N of the internal linear coding is strictly greater than 1,
wherein the linear internal coding is effected independently at each of the T send antennas and for an antenna t of the T send antennas is applied to a modulated data vector of dimension $U_t$ strictly greater than 1, with $$K = \sum_{t=1}^{T} U_t,$$

said generator matrix being a diagonal block matrix, the number of blocks being equal to the number T of send antennas, and the block associated with the antenna t being of dimension $(N/T) \times U_t$.

25. A sending system for multiple users requiring transmission of digital data over a frequency-selective channel with a plurality of send antennas and a plurality of receive antennas, the sending system comprising:
a demultiplexer configured to demultiplex coded and interleaved data into K channels, where K is strictly greater than a number T of the plurality of send antennas;
a modulator configured to modulate output data of the demultiplexer; and
an internal linear encoder configured to code by means of an N×K generator matrix K-dimensional vectors of data at the output of the modulator,
wherein N is strictly greater than T and a yield K/N of the internal linear encoder is strictly greater than 1, and
wherein the linear internal coding is effected independently at each of the T send antennas and for an antenna t of the T send antennas is applied to a modulated data vector of dimension $U_t$ strictly greater than 1, with $$K = \sum_{t=1}^{T} U_t,$$

said generator matrix being a diagonal block matrix, the number of blocks being equal to the number T of send antennas, and the block associated with the antenna t being of dimension $(N/T) \times U_t$.

* * * * *